Sept. 7, 1965     C. MECH ETAL     3,205,028

DOUBLE-CURVED SLIPPER

Filed Oct. 4, 1963

INVENTORS
CHRISTIAN MECH
ALFRED HIRTZ

By Hammond & Littell

ATTORNEYS

United States Patent Office 3,205,028
Patented Sept. 7, 1965

3,205,028
DOUBLE-CURVED SLIPPER
Christian Mech, Paris, and Alfred Hirtz, Boulogne, France, assignors to Societe Rateau, Paris, France, a company of France
Filed Oct. 4, 1963, Ser. No. 313,893
Claims priority, application France, Jan. 19, 1963, 921,980
2 Claims. (Cl. 308—73)

The present invention concerns hydrodynamic gas bearings.

In gas bearings of this type, normal hydrodynamic conditions are established at and beyond a speed of rotation of the moving member, called the transition speed, at which they form an intermediate supporting gas film between the moving member and its supports. Experience and theory show that the optimum carrying ability or "lift" of this gas film is obtained with a particular difference in curvature between the moving member and its journals.

Before hydrodynamic conditions are established, that is to say in the course of what may be called the starting up period, a condition of dry friction exists between the relatively movable surfaces. This condition reappears when the speed of the moving member falls again below the transition speed. Operation with dry friction bewteen the surfaces causes wear of the bearing and it is therefore desirable to reduce the wear by suitable means and, in particular, by any means capable of lowering the transition speed. Experience has shown that the transition speed can be lowered by giving the same curvature to the moving member and its supports.

It is an object of the present invention to provide means for improving the starting characteristics of a hydrodynamic gas bearing while retaining desirable hydrodynamic characteristics.

To this end, the invention provides a hydrodynamic gas bearing with a working or bearing surface which has a double curvature. More precisely, in a gas bearing working or bearing surface of which the curvature is determined with respect to the radius of the moving member so that the gas film has optimum carrying ability or "lift" under hydrodynamic conditions, the invention provides a shallow trough of which the radius is equal or substantially equal to that of the moving member.

This arrangement permits of retaining a curvature of the bearing surface which has desirable hydrodynamic characteristics, and at the same time of lowering the transition speed while increasing the area of contact between the moving member and its supports during the period of dry friction, which lessens the wear of the bearing.

The invention is applicable to various forms of gas bearings. In the case of a bearing having a fixed annular bearing surface, the shallow trough will be provided in the neighborhood of the lowermost part of the bearing surface, while in the case of bearings with at least three bearing slippers, the troughs will be machined in the neighborhood of the middle parts of the slipper surfaces.

The following is a description, by way of example, of a hydrodynamic gas bearing embodying the present invention, reference being made to the accompanying drawing, in which—

The bearing comprises three generally similar slippers 1, 1a and 1b disposed equi-angularly around a shaft 4.

Figure 1:
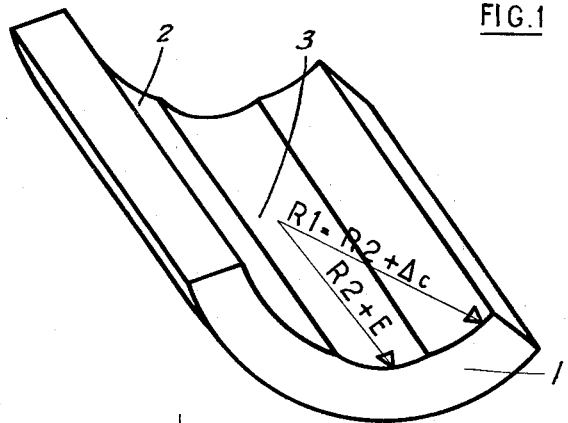
FIGURE 1 is a schematic perspective view of the lowermost bearing slipper unit of the bearing assembly.
Figures 2, 3:
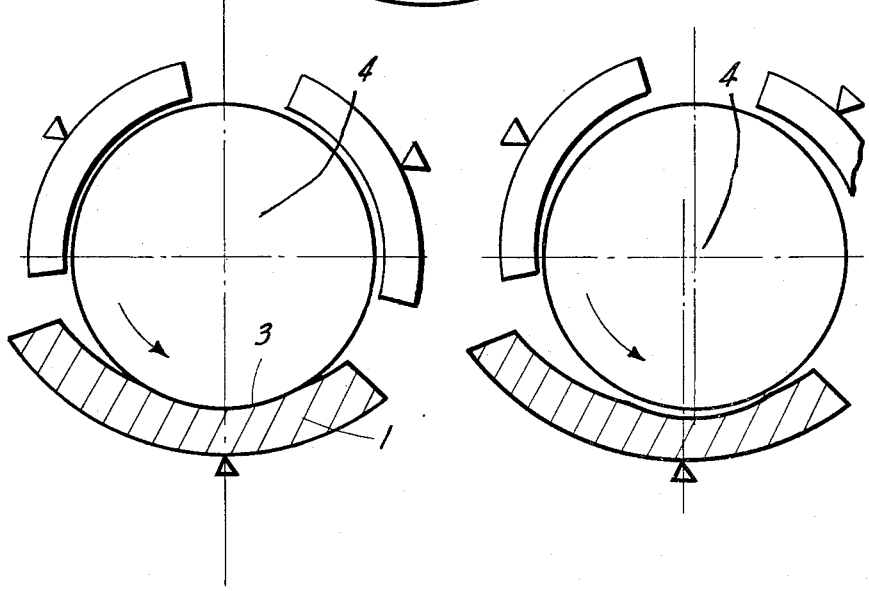
FIGURES 2 and 3 illustrate the relative positions of a shaft and the lowermost slipper of FIGURE 1 in a condition of dry friction and a hydrodynamic condition respectively.

Referring to FIGURE 1, the working or bearing face 2 of the slipper 1 is formed with a radius of curvature $R_1$ which is substantially greater than the radius $R_2$ of the shaft 4. The difference $\Delta c$ between $R_1$ and $R_2$ is such as to ensure optimum carrying ability or "lift" of the lubricating gas film under hydrodynamic conditions. Adjacent the middle part of the bearing face 2, a shallow transversely-curved trough 3 extends parallel to the axis of the bearing for the whole axial length of the slipper. This trough has a radius of curvature equal or substantially equal to the radius $R_2$ of the shaft. In other words, the trough has a radius of curvature $R_2+E$, where $E \cong 0$.

At starting up, a condition of dry friction exists between the shaft 4 and the slipper. This condition remains up to the time of establishment of the supporting gas film at the transition speed. Owing to the trough 3, the area of contact between the shaft 4 and the slipper 1 is considerably greater than that which was obtained previously with bearings having a single curvature. At the same time, experience shows that this arrangement lowers the transition speed, and thereby reduces the duration of the condition of dry friction. Thus, wear of the bearing is considerably reduced.

We claim:

1. A hydrodynamic gas bearing journal assembly comprising: a journal of a rotary member, a plurality of separate bearing slipper units circumferentially spaced around said rotary member, said rotary member being circular in cross-section, the lowermost bearing unit positioned below said rotary member and having a first bearing area having a first finite radius of curvature not less than the radius of said journal member, said first bearing area being in the general form of a concave trough, said bearing surface having a second bearing area having a second finite radius of curvature which is greater than the said first radius of curvature, the said second bearing area being in the general form of two concave troughs lying adjacent the said first trough and parallel thereto, the intersection of said first and each of said second bearing areas each defining a single ridge.

2. The journal bearing assembly of claim 1 wherein the radius of curvature of the said first bearing area is substantially equal to the radius of curvature of the said journal rotary member.

References Cited by the Examiner

UNITED STATES PATENTS 2,134,621 10/38 Pesarese _____ 308—121
2,710,234 6/55 Hansen.

FOREIGN PATENTS 175,921 7/61 Sweden.

DON A. WAITE, *Primary Examiner.*

FRANK SUSKO, *Examiner.*